Patented Mar. 12, 1946

2,396,261

UNITED STATES PATENT OFFICE 2,396,261

PRODUCTS

Jesse Harmon, Wilmington, Del., assignor to E. I. du Pont de Nemours & Company, Wilmington, Del., a corporation of Delaware No Drawing. Application February 22, 1944, Serial No. 523,466

5 Claims. (Cl. 260—488)

This invention relates to new halogen-containing organic chemical products and to a process for their preparation. More paticularly, this invention relates to the reaction of vinyl acetate with carbon tetrachloride and to the products obtained therefrom.

It is known that when an unsaturated compound such as vinyl acetate is treated with a peroxygen catalyst, polymers are obtained. Furthermore, when a mixture of two or more unsaturated compounds, such as vinyl acetate and vinyl chloride is subjected to polymerizing conditions in the presence of a peroxygen catalyst, interpolymers are formed. The macromolecules thus produced have physical properties which are of greater interest than their chemical properties. For example, such solid polymers or interpolymers can be formed into fibres and films while the chemical properties are characteristic of the multiplicity of repeating groups present rather than reactivity of the molecule as a unit. However, it has not previously been discovered that vinyl acetate can be converted into liquid products of relatively low molecular weight by treatment under suitable conditions with carbon tetrachloride.

An object of this invention is the production of compounds which are represented by the general formula

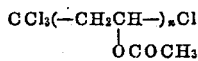

in which $n$ is an integer. Further objects will appear from the description given hereinafter.

These objects are accomplished by the following invention which comprises reacting vinyl acetate with carbon tetrachloride preferably in the presence of a compound which is a catalyst for the polymerization of vinyl acetate and a non-catalyst for the Friedel-Crafts reaction.

The novel reaction products obtained by this invention can be represented by the general formula

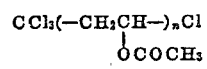

where $n$ is an integer and in general has a value of from 1 to approximately 8. When $n$ in the above formula is unity, the compound is a simple addition product of carbon tetrachloride to vinyl acetate. However, where the value of $n$ is greater than unity, the compounds are not simple addition products. For simplicity, these latter compounds have been called "telomers" and the process for their production has been termed "telomerization." The designation "telomer" is derived from the Greek "telos" meaning "end" and the Greek "mer" meaning "part." "Telomers" differ from simple compounds or polymers in that the end groups of the chain formed from the vinyl compound are characteristic. They differ from polymers or interpolymers in that they have a lower molecular weight and in chemical and physical properties. They are usually liquids or semi-liquids. The broader aspect of telomerization is more completely described in pending application Serial No. 438,466 filed April 10, 1942.

The reaction between carbon tetrachloride and vinyl acetate can be carried out at any temperature between room temperature (25° C.) and approximately 150° C. to produce the 1:1 addition product and liquid products having a plurality of vinyl acetate units and ends from one molecule of carbon tetrachloride. A ratio of vinyl acetate to carbon tetrachloride of between 10 to 3 and 1 to 10 parts by weight is employed in this reaction. The reaction is preferably carried out in the presence of from 0.01 to 5% (based on the weight of vinyl acetate) of a polymerization catalyst, such as benzoyl peroxide, which is effective for the polymerization of vinyl acetate and ineffective as a Friedel-Crafts catalyst. By Friedel-Crafts catalysts are meant such compounds as aluminum chloride or boron trifluoride as used in alkylation or acetylation reactions as described in Chemical Reviews 17, 327–392 (1935). The catalysts operable in the present invention have been designated "telomerization catalysts" in Hanford and Joyce copending application, Serial No. 438,466, filed April 10, 1942. The time for the reaction of carbon tetrachloride with vinyl acetate is not critical, being dependent upon temperature, catalyst and the presence of an inert diluent such as benzene or isooctane. When temperatures of approximately 70° to 80° C. are employed, the reaction readily takes place at atmospheric pressure. When higher temperatures are employed, the reactants are placed in a sealed container capable of withstanding the autogenous pressure developed, or even higher pressures that may be employed.

In the preferred procedure, the reaction is stopped when the major part of the low boiling vinyl acetate and carbon tetrachloride reactants have been used and the products are concentrated by vaporization of the volatile unreacted carbon tetrachloride and vinyl acetate. The reaction product is not a single molecular species but is a mixture of structurally homologous compounds differing from one another by the number of vinyl acetate units which comprise the chain between the chlorine and CCl₃ groups. For many applications, the mixture can be employed per se inasmuch as it is a mixture of functionally similar compounds of varying chain length. Furthermore, where the average number of vinyl acetate units present is large, for example, three to eight, the compounds are subject to decomposition when heated and it is, therefore, undesirable to subject such a mixture to distillation. However, the addition product of carbon tetrachloride to vinyl acetate and the lower molecular weight products, such as those having two or three vinyl acetate units can be distilled at reduced pressure. Products having more than eight vinyl acetate units tend to be solid.

This invention is further illustrated but not limited by the following example in which the parts given are by weight.

*Example*

Into a reaction vessel equipped with a reflux condenser were placed 172 parts of vinyl acetate and 769 parts of carbon tetrachloride. After refluxing for a few minutes, 0.3 part of benzoyl peroxide was added, after which the temperature of the boiling mixture gradually rose from 73° to 84° C. over a period of ten hours. No additional rise in temperature was noted when a similar additional amount of catalyst was added. After distillation of unreacted vinyl acetate and carbon tetrachloride by heating on a water bath at a pressure of 20 centimeters of mercury (absolute), a total of 336 parts of a colorless, oily liquid remained. When this liquid was subjected to vacuum distillation, two principal fractions were obtained. The first fraction boiled at 62.5° C. at 0.9 millimeter and underwent no decomposition upon standing for several weeks. This material was found to contain 59.3% chlorine. The calculated value for the chlorine content of the 1 to 1 addition product of vinyl acetate to carbon tetrachloride, (CCl₃(CH₂CHOCOCH₃)Cl) is 59.1%.

The higher boiling product, which had a boiling point of 107° C. at 1.5 mm. pressure, had a chlorine content of 43.0%. The calculated chlorine content of a compound having two vinyl acetate units combined with one carbon tetrachloride unit (CCl₃CH₂CH(OCOCH₃)CH₂CH(OCOCH₃)Cl)

is 42.2%. Attempted distillation of higher boiling products present in the reaction product, even under diminished pressure, is accompanied by some decomposition.

The 1:1 addition compounds and the products having a plurality of vinyl acetate units and ends from one molecule of carbon tetrachloride which are obtained from vinyl acetate and carbon tetrachloride by the present novel reaction react with aldehyde reagents such as phenylhydrazine and semicarbazide hydrochloride, indicating that the products formed are alpha-chloroesters of acetic acid. For example, the semibarbazone of the 1 to 1 addition product of vinyl acetate and carbon tetrachloride was found to darken at 160° C. and melt with decomposition at 192° C. (uncorrected); it contained 19.3% nitrogen as determined by the Dumas method. The calculated nitrogen content of the compound CCl₃CH₂CH=NNHCONH₂ is 19.3%. A 2,4-dinitrophenylhydrazone was readily prepared and found to melt at 173° C. (uncorrected) when heated at a rate of 10° C. per minute. The analysis for this hydrazone was: N=16.4% (Dumas); calculated for C₉H₇N₄O₄Cl₃:N=16.4%

The reaction products obtained from carbon tetrachloride and vinyl acetate have chlorine which is capable of replacement or further reaction by chemical reagents, for example, halogen can be removed by treatment with a methanolic solution of hydrogen chloride followed by treatment with concentrated aqueous alkali.

As catalysts which are useful in the promotion of this reaction, there can be used any catalyst effective for the polymerization of vinyl acetate and ineffective in the Friedel-Crafts reaction. Useful catalysts include compounds having directly linked oxygen atoms, e. g., peroxygen compounds such as diacyl peroxides such as benzoyl peroxide, propionyl peroxide, lauroyl peroxide; dialkyl peroxides such as diethyl peroxide; other peroxides such as ascaridol, cyclohexanone peroxide, diethyl perdicarbonate hydrogen peroxide, tertiary butyl hydroperoxide, ozone, ozonides, etc. Other catalysts include amine oxides such as trimethylamine oxide; ultra-violet light in the presence of photo sensitizers such as diacetyl, mercury, alkyl iodides and acetone; and metal alkyls. Especially useful when the reaction is carried out in an aqueous emulsion are water soluble persulfates, perborates, and percarbonates, for example, sodium, potassium, or ammonium persulfate, perborate, or percarbonate. Emulsifying agents and/or a buffer may be employed with a persulfate or a similar catalyst when an aqueous system is used. Furthermore, oxidizable sulfoxy compounds such as bisulfite may be advantageously employed in conjunction with a persulfate or similar catalyst in aqueous systems. It is to be understood that carbon tetrachloride and vinyl acetate can react to form the addition product and products of low molecular weight when no catalyst is present, however, the reaction requires a longer period of time. For this reason, the addition of small amounts of a catalyst of the type hereinbefore mentioned is advantageous.

The compounds obtained by the process of this invention are useful as plasticizers, solvents, and in other applications. For many such uses, separation of the individual compounds is unnecessary in view of the fact that the compounds all have the same functional groups and differ only in the number of vinyl acetate units present. By virtue of the presence of active halogen in the 1:1 addition product and products having a plurality of vinyl acetate units and ends from one molecule of carbon tetrachloride produced in this reaction, hydrolysis or other chemical reactions convert these compounds to other materials having further utility for special applications. Thus, hydrolysis gives rise to polyhydroxy compounds useful in resin or coating compositions.

The above description and examples are intended to be illustrative only. Any modification of, or variation therefrom, which conforms to the spirit of the invention, is intended to be included within the scope of the claims.

What is claimed is:

1. A liquid mixture of compounds of the formula

Cl₃C(—CH₂CH—)ₙCl
　　　　　|
　　　　CH₃CO—O wherein *n* is an integer from one to eight.

2. A liquid having the general formula $$Cl_3C(-CH_2CH-)_nCl$$
$$\phantom{Cl_3C(-CH_2}CH_3CO-O$$

wherein $n$ is an integer from one to eight.

3. A liquid of the formula $$Cl_3C-CH_2CHCl-O-COCH_3$$

4. A process of obtaining polychlorinated compounds which comprises reacting at 25–150° C. vinyl acetate with from 0.3 to 10 parts, per part of vinyl acetate, of carbon tetrachloride.

5. Process of claim 4 wherein a peroxy polymerization catalyst is employed.

JESSE HARMON.